United States Patent
Malik et al.

(10) Patent No.: US 10,341,617 B2
(45) Date of Patent: *Jul. 2, 2019

(54) PUBLIC SAFETY CAMERA IDENTIFICATION AND MONITORING SYSTEM AND METHOD

(71) Applicant: Purdue Research Foundation, West Lafayette, IN (US)

(72) Inventors: Abish Malik, Northridge, CA (US); David Scott Ebert, West Lafayette, IN (US); Hanye Xu, West Lafayette, IN (US); James Tay, West Lafayette, IN (US); Shehzad Afzal, West Lafayette, IN (US); Yung-hsiang Lu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 210 days.

This patent is subject to a terminal disclaimer.

(21) Appl. No.: 15/468,101

(22) Filed: Mar. 23, 2017

(65) Prior Publication Data
US 2017/0280106 A1    Sep. 28, 2017

Related U.S. Application Data

(63) Continuation-in-part of application No. 15/468,014, filed on Mar. 23, 2017.
(Continued)

(51) Int. Cl.
*G06F 16/25* (2019.01)
*G06F 16/51* (2019.01)
(Continued)

(52) U.S. Cl.
CPC .............. *H04N 7/181* (2013.01); *G06F 16/29* (2019.01); *G06F 16/51* (2019.01); *G06F 16/951* (2019.01);
(Continued)

(58) Field of Classification Search
CPC ..... H04N 7/181; H04N 5/23206; H04W 4/80; H04W 84/12; H04L 67/10
See application file for complete search history.

(56) References Cited

U.S. PATENT DOCUMENTS 6,587,781 B2 * 7/2003 Feldman .............. G08G 1/0104
701/117
6,930,709 B1 * 8/2005 Creamer ............ H04N 1/00214
348/211.3

(Continued)

OTHER PUBLICATIONS

Lauren Alexander, "Origin—destination trips by purpose and time of day inferred from mobile phone data" Transportation Research Part C 58 (2015) 240-250 (Year: 2015).*

(Continued)

*Primary Examiner* — Sathyanaraya V Perungavoor
*Assistant Examiner* — Philip P. Dang
(74) *Attorney, Agent, or Firm* — Piroozi-IP, LLC

(57) ABSTRACT

A system for determining a travel path, including a network of at least one camera, a communication hub coupled to the network of at least one camera, at least one electronic communication device, and a data processing system coupled to the communication hub, the data processing system comprising one or more processors configured to calculate a travel path based on user-specified criteria including maximum camera coverage, where the system is adapted to dynamically identify a plurality of cameras.

18 Claims, 13 Drawing Sheets

Related U.S. Application Data

(60) Provisional application No. 62/311,950, filed on Mar. 23, 2016.

(51) Int. Cl.

| | | |
|---|---|---|
| *H04N 7/18* | (2006.01) | |
| *H04L 12/751* | (2013.01) | |
| *H04L 29/08* | (2006.01) | |
| *H04W 4/80* | (2018.01) | |
| *G06F 16/29* | (2019.01) | |
| *G06F 16/951* | (2019.01) | |
| *H04L 29/12* | (2006.01) | |
| *H04W 84/12* | (2009.01) | |
| *G06F 3/0484* | (2013.01) | |

(52) U.S. Cl.
CPC .......... *H04L 45/02* (2013.01); *H04L 61/103* (2013.01); *H04L 67/10* (2013.01); *H04W 4/80* (2018.02); *G06F 3/04847* (2013.01); *H04L 61/6095* (2013.01); *H04W 84/12* (2013.01)

(56) References Cited

U.S. PATENT DOCUMENTS

| | | | | |
|---|---|---|---|---|
| 7,027,073 B2* | 4/2006 | Bodin | ............... | H04N 1/00244 345/629 |
| 7,190,810 B2* | 3/2007 | Tanaka | ............... | H04N 5/23203 348/169 |
| 7,486,201 B2* | 2/2009 | Kelly | ............... | G01C 21/3694 340/905 |
| 7,595,833 B2* | 9/2009 | Calisa | ............... | G08B 13/19656 348/333.01 |
| 7,640,567 B2* | 12/2009 | Creamer | ............ | H04N 1/00214 725/105 |
| 7,813,870 B2* | 10/2010 | Downs | ............... | G08G 1/0104 340/995.13 |
| 8,090,524 B2* | 1/2012 | Chapman | .......... | G01C 21/3691 701/117 |
| 8,108,141 B2* | 1/2012 | Ehrlacher | .......... | G01C 21/3461 701/416 |
| 8,161,172 B2* | 4/2012 | Reisman | .......... | G06F 17/30873 709/227 |
| 8,190,362 B2* | 5/2012 | Barker | ............... | G08G 1/0104 701/414 |
| 8,639,267 B2* | 1/2014 | Johnson | .................. | H04W 4/02 370/331 |
| 8,718,910 B2* | 5/2014 | Gueziec | ............... | G08G 1/0112 701/119 |
| 8,855,375 B2* | 10/2014 | Macciola | ............... | H04N 1/387 382/112 |
| 8,866,889 B2* | 10/2014 | Masalkar | ................ | G06F 3/017 348/46 |
| 8,929,877 B2* | 1/2015 | Rhoads | .................... | H04W 4/70 455/420 |
| 9,108,733 B2* | 8/2015 | Sizelove | ................ | B64D 11/0015 |
| 9,208,676 B2* | 12/2015 | Fadell | .................. | G05B 19/042 |
| 9,214,191 B2* | 12/2015 | Guzik | .................. | G11B 27/034 |
| 9,253,376 B2* | 2/2016 | Boyle | ................ | H04N 5/23203 |
| 2007/0098397 A1* | 5/2007 | Chen | ....................... | H04N 5/232 396/429 |
| 2007/0198178 A1* | 8/2007 | Trimby | .................. | G06N 5/003 701/533 |
| 2007/0208497 A1* | 9/2007 | Downs | .................. | G08G 1/0104 701/117 |
| 2009/0083645 A1* | 3/2009 | Fitzmaurice | ........ | G06F 3/04815 715/768 |
| 2010/0211304 A1* | 8/2010 | Hwang | ............... | G01C 21/3484 701/532 |
| 2010/0305851 A1* | 12/2010 | Meyer | ..................... | G01C 21/20 701/532 |
| 2011/0018998 A1* | 1/2011 | Guzik | ..................... | H04N 21/21 348/143 |
| 2011/0096168 A1* | 4/2011 | Siann | ..................... | H04N 7/183 348/158 |
| 2011/0143768 A1* | 6/2011 | Lane | ..................... | H04W 24/08 455/456.1 |
| 2011/0143779 A1* | 6/2011 | Rowe | ..................... | G06Q 30/02 455/456.3 |
| 2011/0173235 A1* | 7/2011 | Aman | ................. | A63B 24/0021 707/792 |
| 2012/0072096 A1* | 3/2012 | Chapman | ............. | G08G 1/0133 701/118 |
| 2012/0115505 A1* | 5/2012 | Miyake | .................. | G06Q 10/06 455/456.1 |
| 2012/0130625 A1* | 5/2012 | Srivastava | ........... | G08G 1/0112 701/119 |
| 2013/0050396 A1* | 2/2013 | Zhu | .......................... | H04N 7/18 348/14.02 |
| 2013/0260791 A1* | 10/2013 | Malinovskiy | ........... | H04W 4/02 455/456.1 |
| 2013/0290909 A1* | 10/2013 | Gray | ....................... | G01C 21/00 715/854 |
| 2014/0019301 A1* | 1/2014 | Meadow | .................. | G06T 17/05 705/26.61 |
| 2014/0043485 A1* | 2/2014 | Bateman | ................ | H04N 7/181 348/159 |
| 2014/0171039 A1* | 6/2014 | Bjontegard | ........... | H04W 4/029 455/414.1 |
| 2014/0278031 A1* | 9/2014 | Scofield | .................... | G08G 1/00 701/118 |
| 2015/0070181 A1* | 3/2015 | Fadell | ..................... | G08B 21/22 340/628 |
| 2015/0096352 A1* | 4/2015 | Peterson | .................. | F24F 11/30 73/31.02 |
| 2015/0163626 A1* | 6/2015 | Zimmer | .................. | H04W 4/90 455/404.2 |
| 2015/0381947 A1* | 12/2015 | Renkis | .................... | H04N 7/181 348/159 |
| 2016/0080205 A1* | 3/2016 | Brown | ................. | H04L 41/0853 709/220 |
| 2018/0278573 A1* | 9/2018 | Lu | ........................... | H04L 67/02 |

OTHER PUBLICATIONS

Francesco Calabrese, "Real-Time Urban Monitoring Using Cell Phones: A Case Study in Rome", 1524-9050/$26.00 © 2010 IEEE (Year: 2010).*

"Mobile phone data from GSM networks for traffic parameter and urban spatial pattern assessment: a review of applications and opportunities" Geo Journal, Apr. 2013, vol. 78, Issue 2, pp. 223-243 (Year: 2013).*

Jameson L. Toole, "The path most traveled: Travel demand estimation using big data resources", http://dx.doi.org/10.1016/j.trc.2015.04.022, 0968-090X/ 2015 Published by Elsevier Ltd. (Year: 2015).*

Widhalm, Peter, Yingxiang Yang, Michael Ulm, Shounak Athavale, and Marta C. González. "Discovering Urban Activity Patterns in Cell Phone Data." Transportation 42, No. 4 (Mar. 27, 2015): 597-623. (Year: 2015).*

Nathan Jacobs, Nathaniel Roman, and Robert Pless; "Consistent temporal variations in many outdoor scenes"; In IEEE Conference on Computer Vision and Pattern Recognition; 2007.

Ahmed Kaseb, Anup Mohan, and Yung-Hsiang Lu; "Cloud resource management for image and video analysis of big data from network cameras"; In International Conference on Cloud Computing and Big Data; 2015.

Youngsol Koh, Anup Mohan, Guizhen Wang, Hanye Xu, Abish Malik, Yung-Hsiang Lu, and David S. Ebert; "Improve Safety using Public Network Cameras"; IEEE Symposium on Technologies for Homeland Security; 2016.

Weddle, E; "Purdue installing exterior security cameras"; Retrieved Jun. 1, 2014; Available: http://www.jconline.com/article/20100309/NEWS0501/100308024.

Eick, S.G., Eick, M.A., Fugitt, J., Horst, B., Khailo, M., Lankenau, R.A.; "Thin Client Visualization"; IEEE Symposium on Visual Analytics Science and Technology; 2007.; Oct. 30, 2007-Nov. 1, 2007; pp. 51-58.

(56) References Cited

OTHER PUBLICATIONS

Kray, C., Elting, C., Laakso, K., Coors, V.; "Presenting route instructions on mobile devices"; In Proceedings of the 8th International Conference on Intelligent User Interfaces (IUI); ACM (2003); 117-124.

Goczyla, K.Cielatkowski, J; "Optimal Routing in a Transportation Network"; European Journal of Operational Research; 1995; 87; 214-222.

Reddy,S., Shilton, K., Denisov, G.,Cenizal, C., Estrin, D., Srivastava,M. B.; "Biketastic: Sensing and mapping for better biking"; in Proc. SIGCHI Conf. Human Factors Compute. Syst.; 2010; pp. 1817-1820.

Duke, J.; "Visualizing Seattle's 911 calls"; Retrieved Jun. 2014; Available: http://jmduke.com/posts/visualizing-seattles-911-calls/.

Eck, J.E., Chainey, S., Cameron, J.G., Leitner, M., Wilson, R.E.; "Mapping crime: Understanding hotspots"; 2005; pp. 1-71.

Razip, A.M.M., Malik, A., Afzal, S., Potrawski, M., Maciejewski, R., Yun Jang, Elmqvist, N., Ebert, D. S.; "A Mobile Visual Analytics Approach for Law Enforcement Situation Awareness"; 2014 IEEE Pacific Visualization Symposium (PacificVis); Mar. 2014; pp. 169-176; 4-7.

Luc, A., Cohen, J., Cook, D., Gorr, W., Tita, G.; "Spatial analyses of crime"; Criminal justice 4; No. 2 (2000); 213-262.

Hsinchun, C., Chung, W., Xu, J.J., Wang, G., Qin, Y., Chau, M.; "Crime data mining: a general framework and some examples"; Computer; vol. 37; No. 4; Apr. 2004; pp. 50,56.

Daniel, G., Chen, M.; "Video visualization"; Visualization; 2003; VIS 2003; IEEE; Oct. 2000; pp. 409-416; 24-24.

Walton, S., Chen, M., Ebert, D.; "LiveLayer: Realtime Traffic Video Visualization on Geographical Maps"; Available:https://www.purdue.edu/discoverypark/vaccine/assets/pdfs/publications/pdf/Real-time%20Traffic%20Video%20Visualisation%20on%20Geographical%20Maps.pdf.

Collins, R., Lipton, A., Kanade, T., Fujiyoshi, H., Duggins, D., Tsin, Y., Tolliver, D., Enomoto, N., Hasegawa, O.; "A system for video surveillance and monitoring"; Tech. Rep. CMU-RI-TR-00-12; Carnegie Mellon University; Robotics Institute; May 2000.

Malik, A., Maciejewski, R., Collins T. F., Ebert, D.S.; "Visual analytics law enforcement toolkit"; In Proceedings of IEEE Conference on Technologies for Homeland Security; 2010; pp. 222-228.

Hanye Xu, J. Tay, A. Malik, S. Afzal, and D.S. Ebert; "Safety in view: A public safety visual analytics tool based on cctv camera angles of view"; In IEEE International Symposium on Technologies for Homeland Security; 2015.

Tjerk Timan and Nelly Oudshoorn; "Mobile cameras as new technologies of surveillance? how citizens experience the use of mobile cameras in public nightscapes"; Surveillance & Society; 2012; 10(2):167.

Tomi D Raty; "Survey on contemporary remote surveillance systems for public safety"; Systems, Man, and Cybernetics, Part C: Applications and Reviews; IEEE Transactions on, 2010; 40(5): 493-515.

Ahmed S. Kaseb, Wenyi Chen, Ganesh Gingade, and Yung-Hsiang Lu; "Worldview and route planning using live public camera"; In Imaging and Multimedia Analytics in a Web and Mobile World; 2015.

\* cited by examiner

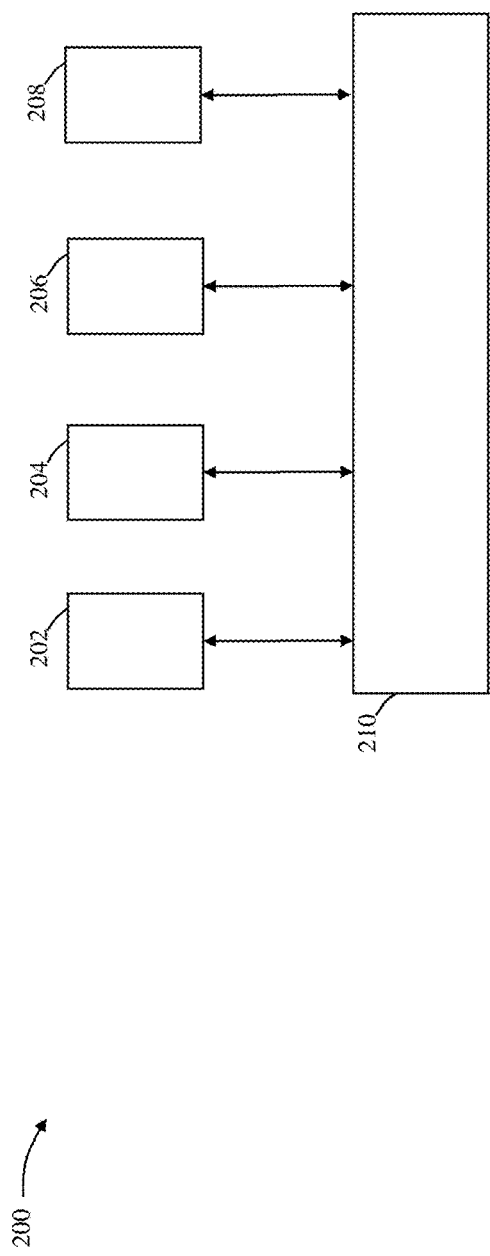

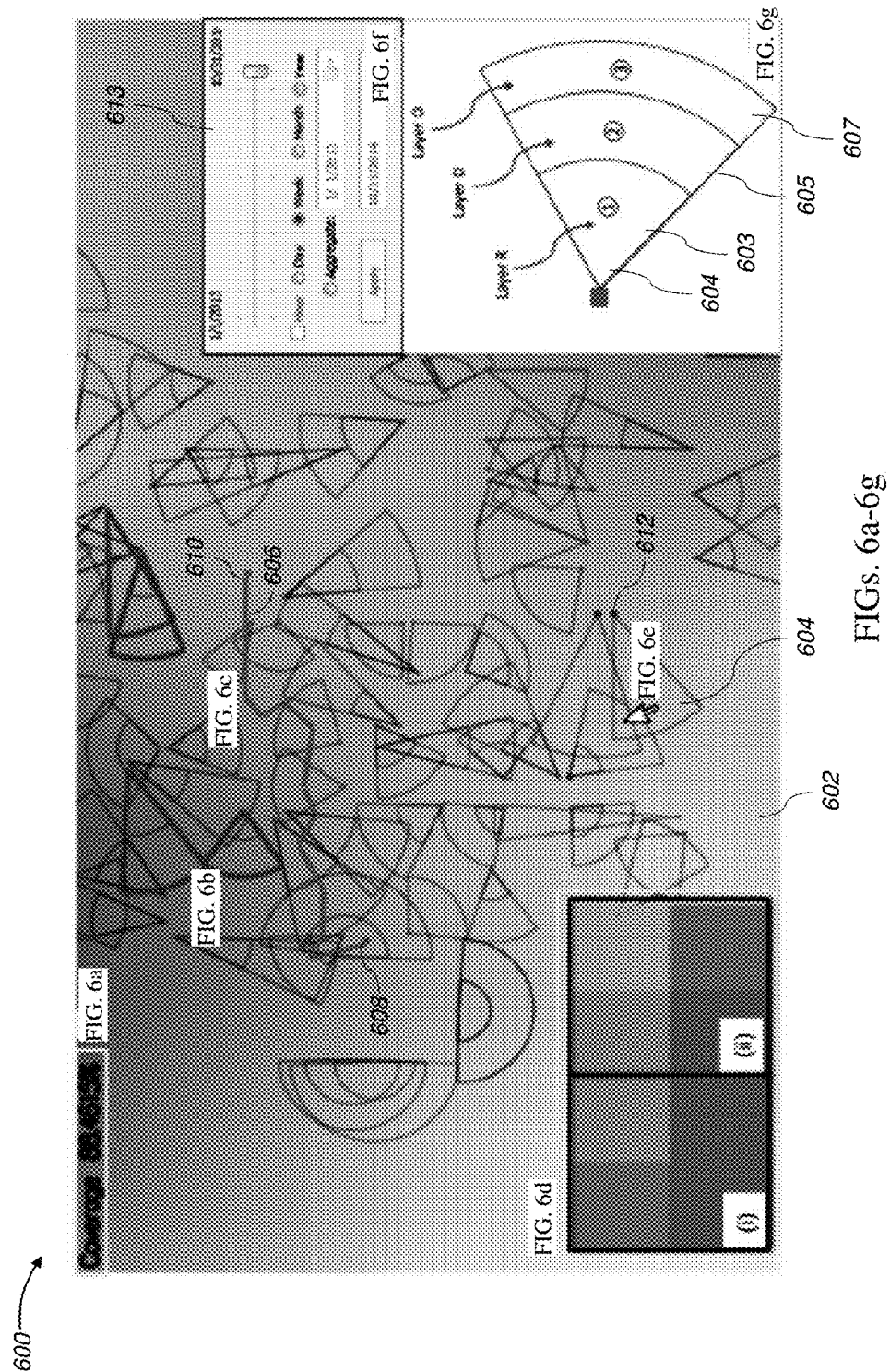

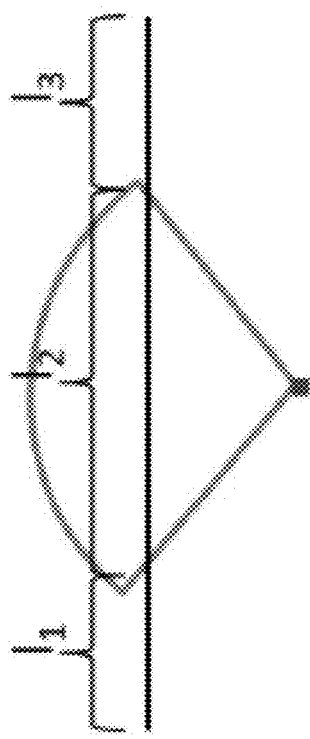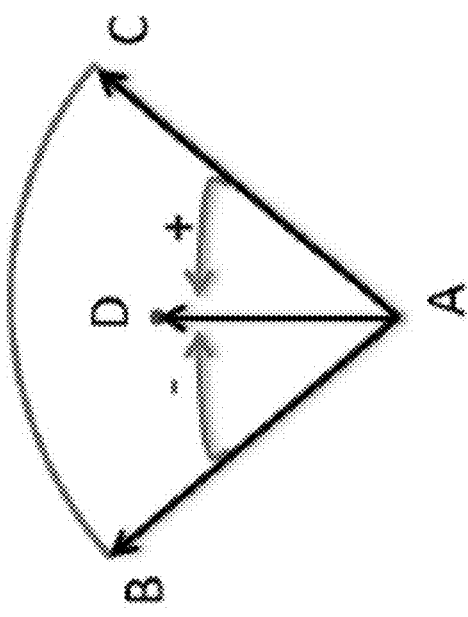
FIG. 8a Coverage Percentage = $l_2 / (l_1 + l_2 + l_3)$
FIG. 8b

PUBLIC SAFETY CAMERA IDENTIFICATION AND MONITORING SYSTEM AND METHOD

CROSS-REFERENCE TO RELATED APPLICATIONS

The present application is a continuation-in-part of the U.S. patent application Ser. No. 15/468,014 filed Mar. 23, 2017, which is related to and claims the benefit of U.S. Provisional Patent Application Ser. No. 62/311,950, filed Mar. 23, 2016, and also related to a concurrently filed U.S. patent application Ser. No. 15/468,068, the contents of each of which is hereby incorporated by reference in its entirety into this disclosure.

STATEMENT REGARDING GOVERNMENT FUNDING

This invention was made with government support under 2009-ST-061-CI0003 awarded by the Department of Homeland Security. The government has certain rights in the invention.

TECHNICAL FIELD

The present application relates to public safety systems, and more specifically, to a visual analytics system based on integration of publicly available cameras with closed-circuit television cameras.

BACKGROUND

This section introduces aspects that may help facilitate a better understanding of the disclosure. Accordingly, these statements are to be read in this light and are not to be understood as admissions about what is or is not prior art.

Personal safety is a serious concern in modern society. For example, educational institutions invest substantial resources and funding to maintain campus safety, which is important to both students and parents when choosing an educational institution. Similarly, cities and urban areas around the world invest heavily in infrastructure to boost security and situational awareness. As part of these efforts, more high-quality surveillance cameras are being installed on campuses and other public areas to monitor safety of patrons. The installation rates of these cameras are also increasing. For example, according to the record of one major university police department, more than 100 Closed Circuit Television (CCTV) cameras were installed in 2014 compared to 54 such CCTV cameras in 2010. With the increasing number of CCTV cameras as well as publicly available cameras and datasets produced thereby, there is a shortage of analysis tools for both police and pedestrians to make good use of such datasets. These same concerns and challenges exist in the context of safety systems in other public environments, including shopping malls, amusements parks, and municipalities. However, making efficient use of the data received from the increasing number of monitoring cameras remains a difficult challenge.

Therefore, there is an unmet need for a novel system and method that can integrate CCTV cameras with publicly available cameras and utilize datasets from these cameras in order to provide real-time safety improvements for police departments, pedestrians, and other users of the system.

SUMMARY

A method for determining a travel path is described herein. The method includes establishing an interface with a $3^{rd}$-party mapping system via an electronic communication device, receiving a start point and an end point by a user on the interface for a preselected zone, generating input data for the $3^{rd}$-party mapping system based on the start and end points, providing the input data to the $3^{rd}$-party mapping system, receiving output data from the $3^{rd}$-party mapping system associated with a path from the start point to the end point, identifying waypoints in the output data, identifying a camera from a predetermined list of cameras of the preselected zone closest to a line between each of the two consecutive waypoints, determining the center of a viewing angle of the identified camera from a list of predetermined viewing angles for each of the cameras in the list of cameras of the preselected zone, calculating a path from the start point through each of the viewing angle centers to the end point, and displaying the calculated path on the electronic communication device. The predetermined list of cameras is determined by receiving name of an organization, identifying a range of internet protocol (IP) addresses associated with the organization, querying each IP address in the range of the IP addresses, receiving a response from the IP addresses in response to the queries, verifying the received response is from a camera by obtaining an image file from the IP address and analyzing the image file, and adding the IP address to the predetermined list of cameras. Location of each camera is determined using an IP address to physical address translator, and verifying the location information by using a street-view of a $3^{rd}$-party mapping software.

A system for determining a travel path is disclosed. The system includes a network of at least one camera, a communication hub coupled to the network of at least one camera, at least one electronic communication device, a data processing system coupled to the communication hub. The data processing system comprising one or more processors adapted to establishing an interface with a $3^{rd}$-party mapping system via the electronic communication device, receiving a start point and an end point by a user on the interface for a preselected zone, generating input data for the $3^{rd}$-party mapping system based on the start and end points, providing the input data to the $3^{rd}$-party mapping system, receiving output data from the $3^{rd}$-party mapping system associated with a path from the start point to the end point, identifying waypoints in the output data, identifying a camera from a predetermined list of cameras of the preselected zone closest to a line between each of the two consecutive waypoints, determining the center of a viewing angle of the identified camera from a list of predetermined viewing angles for each of the cameras in the list of cameras of the preselected zone, calculating a path from the start point through each of the viewing angle centers to the end point, and displaying the calculated path on the electronic communication device. The predetermined list of cameras is determined by receiving name of an organization, identifying a range of internet protocol (IP) addresses associated with the organization, querying each IP address in the range of the IP addresses, receiving a response from the IP addresses in response to the queries, verifying the received response is from a camera by obtaining an image file from the IP address and analyzing the image file, and adding the IP address to the predetermined list of cameras. Location of each camera is determined using an IP address to physical address translator, and verifying the location information by using a street-view of a $3^{rd}$-party mapping software.

BRIEF DESCRIPTION OF THE DRAWINGS

In the following description and drawings, identical reference numerals have been used, where possible, to designate identical features that are common to the drawings.

FIG. 2 is a block diagram of operations that take place in the data processing system of FIG. 1, including a data processing block.

FIG. 6a is a screenshot of the system of FIG. 1 adapted to be displayed on the one or more electronic communication devices.

FIG. 6b is a schematic representation of cameras with highest crime, traffic, and civil (CTC) incidents for a given timeframe.

FIG. 6c is a schematic representation of a calculated path that maximizes camera coverage.

FIG. 6d is a schematic representation of two grids (i and ii) adjoin to each other representing the number of crimes that occurred in the grid area in a given timeframe.

FIG. 6e is a schematic representation of a camera and its viewing angle as selected by a user on the electronic communication device.

FIG. 6f shows an interactive time selection interface on the electronic communication device that allows users to select a historical time window for CTC analysis at various data aggregation levels (e.g., by day, week, month, year).

FIG. 6g is a schematic representation of each camera having up to three viewing ranges.

FIG. 8a is a schematic representation depicting the percentage coverage of a camera along two points.

FIG. 8b is a schematic representation of vectors AB and AC of a viewing angle and the center point (D) of the viewing angle forming vector AD such that if point D is inside a sector, the cross-product result of vector AB and AD is negative and the cross-product result of vector AC and AD is positive.

DETAILED DESCRIPTION

Figure 1:
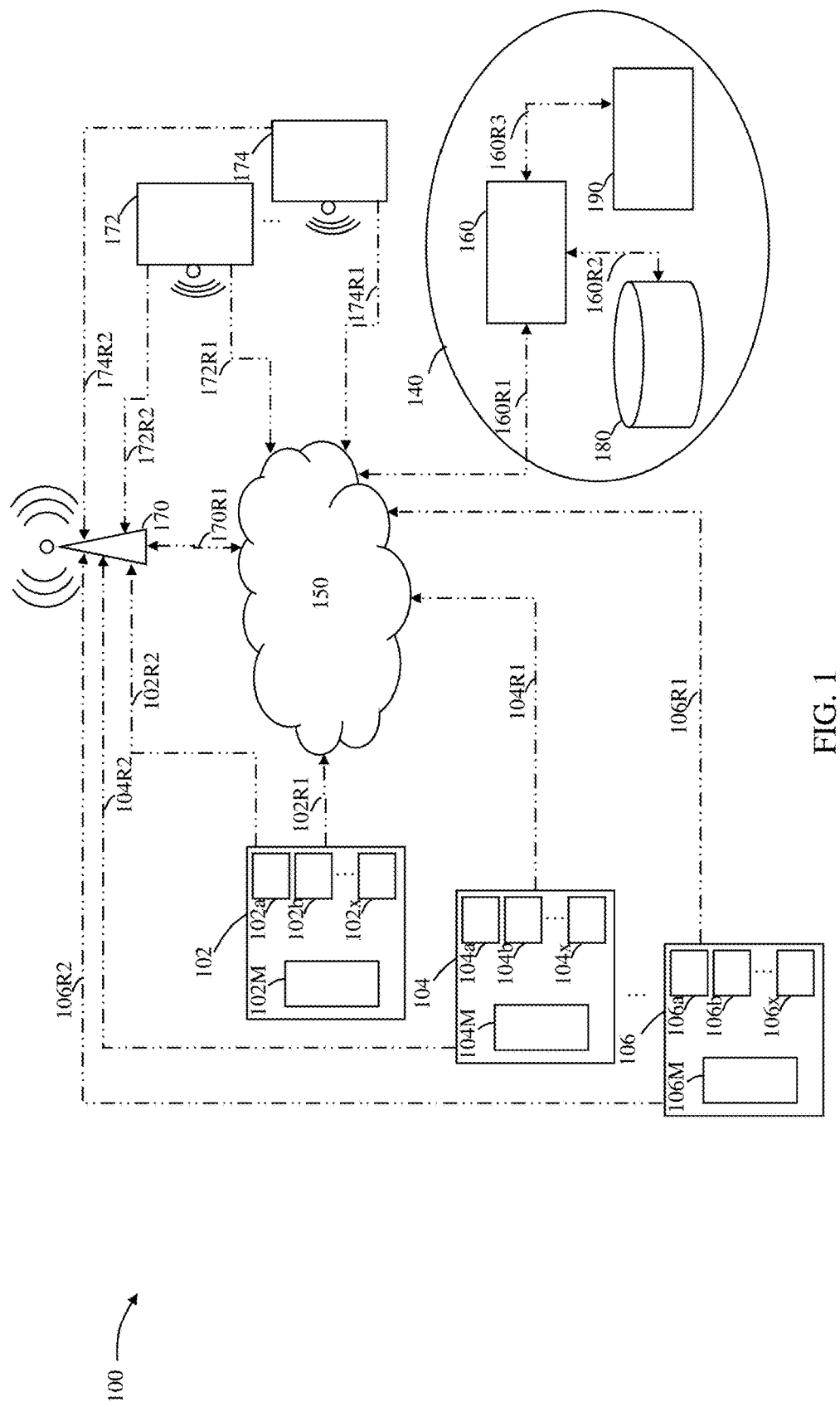
FIG. 1 is a schematic of system according the present disclosure for determining a travel path including a data processing system, and one or more electronic communication devices.

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel system and method that can integrate closed-circuit television (CCTV) cameras with publicly available cameras and utilize datasets from these cameras in order to provide real-time safety improvements for police departments, pedestrians, and other users of the system is provided in the present disclosure.

In the present disclosure, a cloud-based system is provided that integrates publicly available cameras as well as CCTV cameras adaptable for providing an optimum travelling path (e.g., walking or driving) such that for a chosen start and finish points the path is associated with one or more predetermined criteria (e.g., most camera viewing range and angle, least recorded historical criminal events, etc.). The cloud-based system comprises a network of cameras including CCTV and publicly available cameras (at least one but designed to integrate hundreds of thousands), and a cloud-based analytics platform having a processing unit and a memory.

Referring to FIG. 1, a schematic of components of a system 100 according to one embodiment of the present disclosure is provided. The system 100 includes in general terms at least a network of at least one camera 102, 104, . . . 106. The system 100 is adaptable to include only one camera up to hundreds of thousands of cameras. Each camera (e.g., 102), may include one or more communication blocks (102a, 102b, . . . 102x for camera 102; 104a, 104b, . . . 104x for camera 104; and 106a, 106b, . . . 106x for camera 106). These communication blocks are configured based on various communication protocols (e.g., 802.11, cell phone protocols such as CDMA or GSM, or any other wireless protocol such as Bluetooth, or other). Each of these cameras can be connected to a local network device, e.g., a cell tower 170 or via a router (not shown) and then to a cloud-based information exchange 150. The connectivity between cameras (102, 104, . . . 106) and the cloud-based information exchange 150 is identified as 10_R1 (e.g., 102R1, 104R1, and 106R1). Alternatively, connectivity to the cell tower 170 is identified as 10_R2 (e.g., 102R2, 104R2, and 106R2). Each camera (102, 104, . . . 106) also includes an optic block 10_M (e.g., 102M, 104M, and 106M) which includes the associated optical and electronic components present in cameras (publicly available or CCTV), known to a person having ordinary skill in the art. The cloud-based information exchange 150 and the tower 170 individually or together represent a communication hub.

Also, shown in FIG. 1 is a data processing system 140, comprising one or more processing units 160, one or more databases (or otherwise referred to as storage devices) 180, and one or more user input/output devices 190. The one or more processing units 160 communicates with the one or more databases 180 via connectivity 160R2 (e.g., Ethernet, Bluetooth, etc.), and with the one or more input/output devices 190 via connectivity 160R3 (e.g., Ethernet, Bluetooth, etc.). The data processing system 140 communicates with the cloud-based information exchange 150 via connectivity 160R1.

Also, shown in FIG. 1 are user devices 172 . . . 174 (e.g., cell phones), also referred to as electronic communication devices, adapted to be connected to the cell tower 170 by cell phone protocols such as CDMA or GSM (via connectivity 17_R2, e.g., 172R2 . . . 174R2); or directly to the cloud-based information exchange 150 via, other wireless protocol such as Bluetooth, or other, using connectivity 17_R1, e.g., 172R1 and 174R1. Each such user device (e.g., 172 . . . 174) allows users to communicate with the data processing system 140 through the cloud-based information exchange 150. Additional information regarding FIG. 1 is provided at the end of the present disclosure.

The one or more processing units 160 shown in FIG. 1 includes an operational system 200 depicted in FIG. 2. The operational system 200 includes several blocks including a camera identification block 202, a camera metadata block 204, a third-party mapping interface 206, a camera-associated information data block 208, and a data processing block 210. According to one embodiment of the present disclosure, the camera identification block 202 identifies cameras in a particular geographical zone of interest. Such a zone may be based on postal zip-codes, a township, a university campus, a shopping mall, etc. The camera identification block 202 is based on a predetermined list of cameras provided for a predetermined zone. For example, for a university campus, the camera identification block 202 includes a list of cameras deployed throughout the campus that are viewable by authorities (e.g., campus police). This list provides camera identifiers.

According to one embodiment of the present disclosure, the camera metadata block 204 provides camera metadata in the geographical zone of interest (e.g., a university campus). The metadata includes location of the camera, viewing angle, and other data associated with camera type. The camera metadata block 204 is based on a predetermined list of camera metadata provided for the cameras identified by the camera identification block 202. For each camera identified in the camera identification block 202, metadata associated with that camera is provided in the camera metadata block 204. For example, for each camera from the list of cameras (e.g., cameras 102, 104, . . . 106 shown in FIG. 1), the camera metadata block 204 provides location data, viewing angle, whether equipped with infrared capabilities, range of camera for both daytime as well as night time and based on if equipped with infrared capabilities, internet protocol (IP) address provided in a transmission control protocol and IP (TCP/IP) network, make-model and serial number of the camera, communication protocol, frame rate, etc. Therefore, once the cameras identification has been provided by the camera identification block 202, the camera metadata block 204 communicates the above-mentioned information about the cameras to the data processing block 210.

According to one embodiment of the present disclosure, the third-party mapping interface 206 provides an interface to a $3^{rd}$-party mapping system (e.g., BING MAP). The third-party mapping interface 206 provides input data to the $3^{rd}$-party mapping system and receives output mapping data from the $3^{rd}$-party mapping system. In addition, the third-party mapping interface 206 provides an input/output interface that enables a user to provide inputs (such as a start point and end point) and provide output to the user (such as a travel path). The interface is provided to the user devices 172 . . . 174, through the cloud-based information exchange 150 or the cell tower 170 (see FIG. 1). Once the user inputs data including a start point and an end point through the third-party mapping interface 206, the $3^{rd}$-party mapping system provides a map that is then augmented by the data processing block 210, as fully described below, in order to provide the optimum travel path based on specified criteria by the user (e.g., maximum camera viewing coverage, etc.).

According to one embodiment of the present disclosure, the camera-associated information data block 208 provides camera-associated information to the data processing block 210. The camera-associated information includes historical crime, traffic, and civil (CTC) data associated for each camera identified by the camera identification block 202. For example, for each camera from the list of cameras (e.g., cameras 102, 104, . . . 106 shown in FIG. 1), the camera-associated information data block 208 provides proximity, date, time of day of CTC incidents. Therefore, once the cameras identification has been provided by the camera identification block 202, the camera-associated information data block 208 communicates the above-mentioned information about the cameras to the data processing block 210.

According to one embodiment of the present disclosure, the data processing block 210 receives camera identification information from the camera identification block 202, camera metadata from the camera metadata block 204, $3^{rd}$-party mapping information from the third-party mapping interface 206, and camera-associated information from the camera-associated information data block 208. The data processing block 210 utilizes these data to provide an optimum travel path (walking or driving) that meets a user's specified criteria as well as a method to suggest future camera installation sites. The user via the user devices 172 . . . 174 (see FIG. 1) provides the criteria and the data processing block 210 utilizes the criteria to provide the appropriate output. The data processing block 210 represents one set of processing operations of the one or more processing units 160. These processing operations, according to the present disclosure, provide i) a safe travelling path based on user specified criteria; and ii) a method for suggesting future camera sites. The criteria include but are not limited to travel mode (i.e., walking, driving, bicycling, etc.); optimization of travel path based on the shortest distance, shortest travel time; maximizing camera viewing angle without concern for added travel time; maximizing camera viewing angle but with a limit on added travel time; and avoiding CTC-prone areas with selective CTC incidents of less than an upper threshold. For example, a user may specify an upper threshold of about 10% for crime incidents or about 5% for traffic incidents, where percent selective CTC is defined as the selective CTC incidents for a camera divided by the total selective CTC for all the cameras combined, and the upper threshold represents accumulative percent selective CTC for the cameras utilized in the optimum path. The data processing block 210 also based on historical selections by users (including start and end points, and the provided criteria) and existing historical CTC data calculates future camera installation sites to improve output data.

Figure 3A:
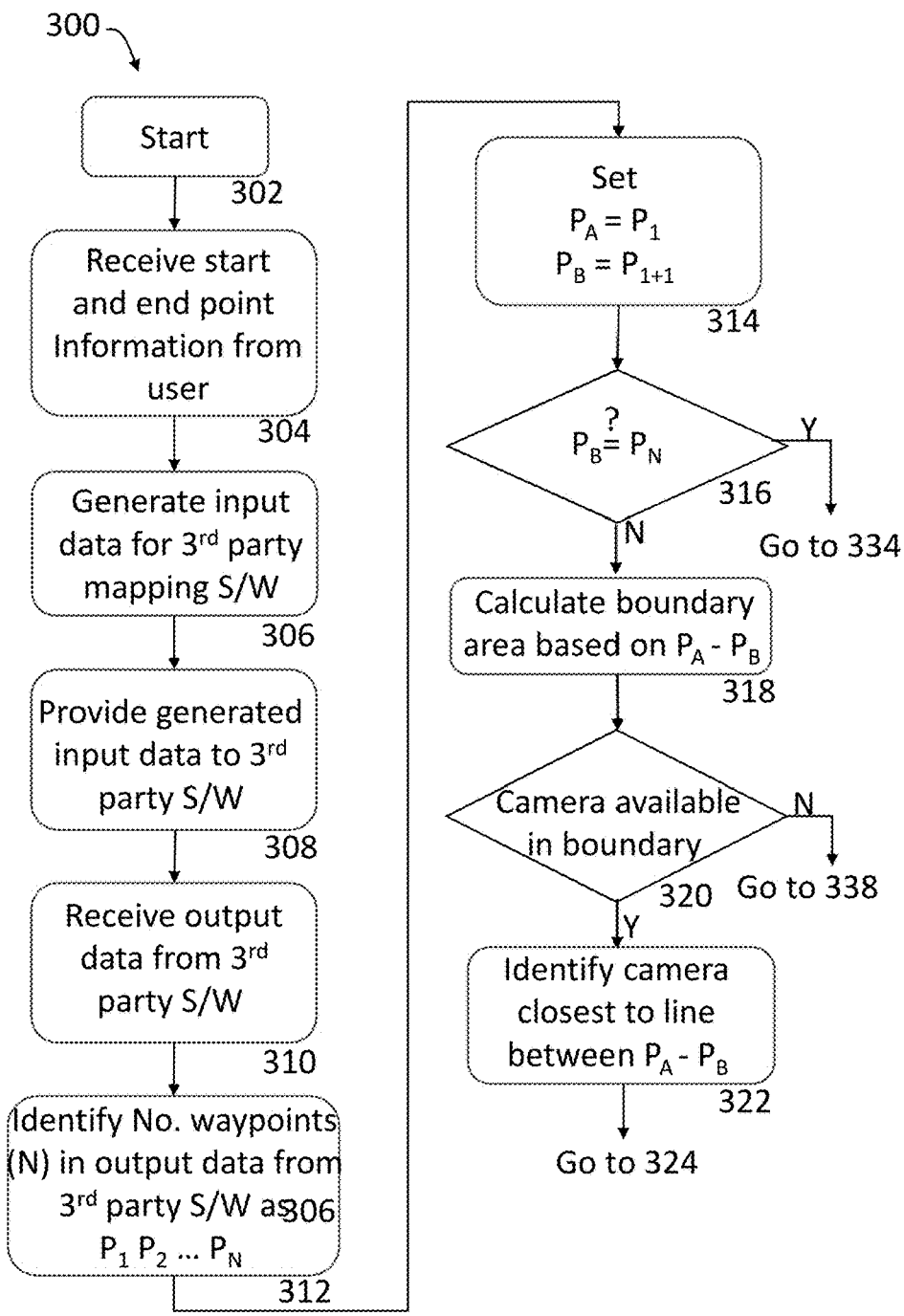
FIGS. 3a and 3b are a flowchart (spanning between FIGS. 3a and 3b) of the steps that take place in the data processing block of FIG. 2.
Figure 3B:
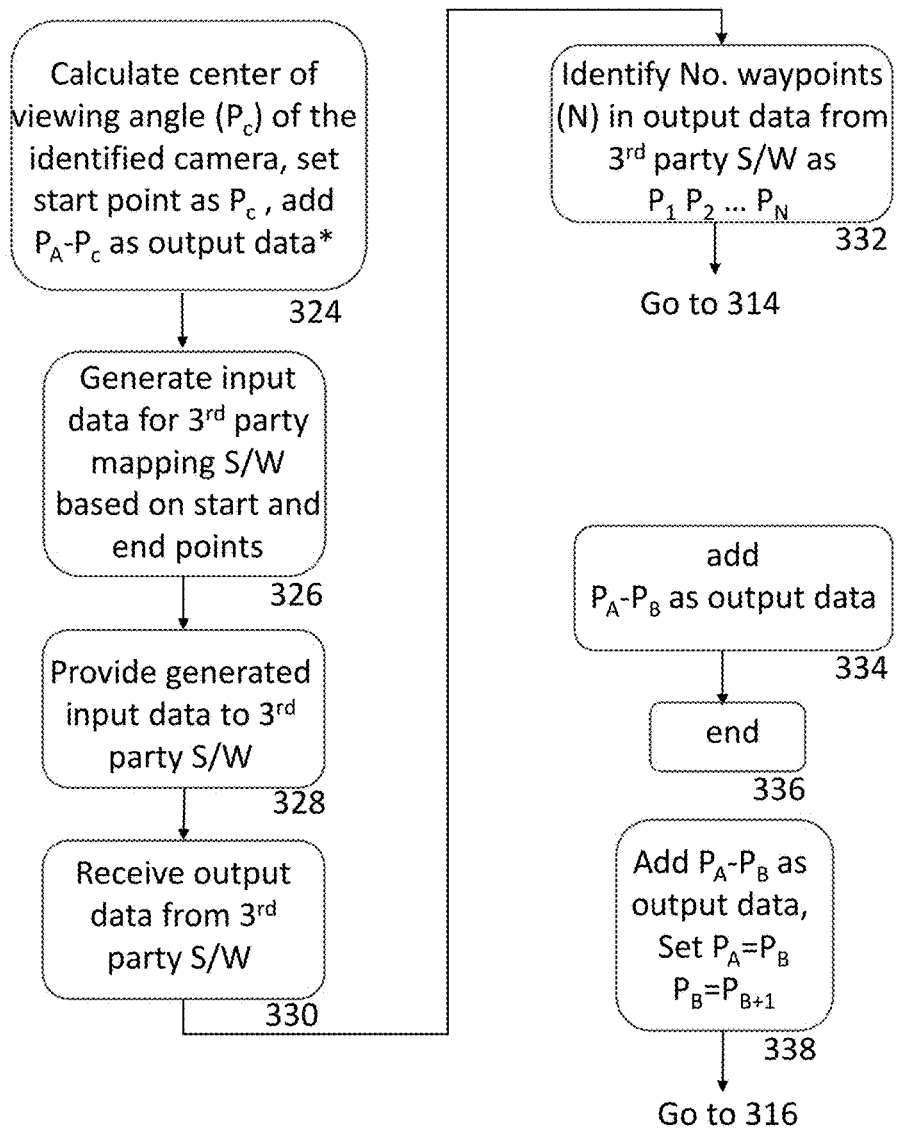

Referring to FIGS. 3a and 3b, a flowchart 300 of one exemplary embodiment of operations of the data processing block 210 is provided. The flowchart 300 spans between FIGS. 3a and 3b. The flowchart 300 begins at the start block 302. Next, flowchart 300 receives start and end points from the user via the user devices 172 ... 174 (see FIG. 1), by using the third-party mapping interface 206 utilizing the $3^{rd}$-party mapping system's graphical user interface. The user also provides information such as criteria including travel mode (walking, driving, etc.) as described above. Next, per block 306, the data processing block 210 (see FIG. 2) generates an input dataset for the $3^{rd}$-party mapping system. The input dataset includes geolocations associated with the start and end points as chosen by the user as well as travel mode. The data processing block 210 translates user's inputs ("clicks") on the map to geo-coordinates. According to one embodiment the data processing block 210 translates the pixel coordinate on the map to the real-world geo coordinate utilizing, e.g., formulas in World Geodetic System (WGS), and in particular WGS84 which is a geographic reference system known to a person having ordinary skill in the art. An exemplary input dataset is provided below: "http://dev.virtualearth.net/REST/v1/Routes/Walking?wp 0.0=40.427039,-86.916622&wp.1=40.427561,-86.910442&optimize=distance&routePathOutput=Points&output=json&tolerances=0.00000344978&travelMode=Walking&key=AlegUVWT7-VmcSHHhOnGAOqZIrMqBJbZluLvQ9gge8i3RjcYb15DP5ajOzdAPLCg"

Where "REST" indicates use of REST API service,
"Routes" indicates results of route calculation,
"Walking" specifies the parameter for walking route,
the "wp.0" is the parameter for start geo-coordinate and the "wp.1" is the parameter for the end geo-coordinate,
the general interface for waypoints is "wp.n", n is the index number of waypoint (a subset of waypoints can be input in sequential order),
"optimize=distance" refers to a request for the shortest route,
"routePathOutput=Points" refers to requesting the result of a route as sequential waypoints, and
"output=json" specifies the output file format.
The link of official website for BING MAPS REST services is: "https://msdn.microsoft.com/en-us/library/ff701717.aspx".

Next, per block 308, the data processing block 210 (see FIG. 2) provides the generated input dataset to the $3^{rd}$-party mapping system. Next, per block 310, the data processing block 210 (see FIG. 2), receives an output dataset from the $3^{rd}$-party mapping system representing a calculated direction map from the provided start point to the provided end point based on the user-specified criteria including travel mode. An example of an output dataset is provided below: The link "https://msdn.microsoft.com/en-us/library/gg636955.aspx" has an example of walking route:

Once parsed, the original json output provides the following useful information such as ""coordinates":[[36.091084,-89.519396],[36.089138,-89.512267],[36.088832,-89.502798],[36.088548,-89.49679],[36.08843,-89.496511],[36.088049,-89.496098],[36.08747,-89.495632],[36.087411,-89.49532],[36.08718,-89.49532],[36.08682,-89.49517],[36.08586,-89.494441],[36.085351,-89.494317],[36.08505,-89.494349],[36.07783,-89.495717],[36.077379,-89.495857],[36.076741,-89.496189],[36.074278,-89.497568],[36.074241,-89.497391],[36.074788,-89.493051],[36.074799,-89.492021],[36.074681,-89.490637],[36.074611,-89.489779],[36.073452,-89.480531],[36.069628,-89.447861],[36.06945,-89.44505],[36.0693,-89.424708999999993],[36.068952,-89.416748],[36.06819,-89.373157],[36.067428,-89.360137],[36.0676,-89.358007],[36.068142,-89.35562],[36.068871,-89.353759],[36.069311,-89.352917],[36.07069,-89.350798]]".

Figure 4B:
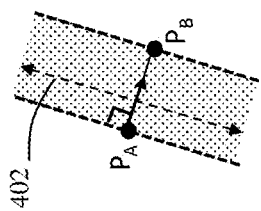
FIG. 4b is a schematic of two consecutive waypoints of FIG. 4a, showing a boundary defined about the waypoints.
Figure 4A:
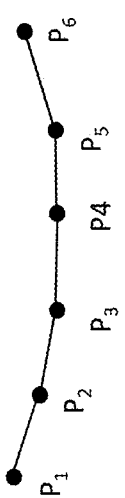
FIG. 4a is a schematic of travel paths obtained from a $3^{rd}$-party mapping system, including a number of waypoints.
Figure 5B:
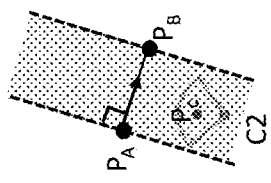
FIG. 5b is a schematic of the two consecutive waypoints of FIG. 5a, showing selection of one of the two cameras based on proximity to a perpendicular line between the two consecutive waypoints.
Figure 5A:
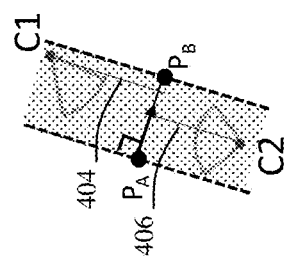
FIG. 5a is a schematic of the two consecutive waypoints of FIG. 4b, including two cameras identified within the boundary.

Next, per block 312, the data processing block 210 (see FIG. 2) parses the output dataset and identifies number of waypoints as $P_1, P_2, \ldots P_N$. Every two adjacent waypoints are treated as a sub path that are used to search for the nearest camera locations. Referring to FIG. 4a, a schematic of this path is shown between P1 and P6). Next, per block 314 (see FIG. 3a) the data processing block 210 (see FIG. 2) sets temporary waypoints $P_A$ and $P_B$ to $P_1$ and $P_{1+1}$, respectively. Next, per decision block 316 (see FIG. 3a) the data processing block 210 (see FIG. 2) quarries whether $P_B$ equals $P_N$ (i.e., whether $P_B$ represents the last waypoint in the output dataset). If the answer is yes (the path identified as "Y") then the data processing block 210 (see FIG. 2) traverses to block 334 (see FIG. 3b and discussed below). If the answer is no (the path identified as "N") then the data processing block 210 (see FIG. 2) proceeds to block 318 (see FIG. 3a). At block 318 (see FIG. 3a), the data processing block 210 (see FIG. 2) calculates a rectangular (or other shapes such as circular) boundary based on parallel lines passing through the waypoints $P_A$ and $P_B$. Referring to FIG. 4b, a schematic of this boundary is shown. This boundary filters out a large number of cameras that are not close to this sub path. The boundary in this exemplary embodiment is based on a rectangle defined by a width between $P_A$ and $P_B$ and a height 402 that can be a selective input provided by the user or predetermined as part of the data processing block 210 (see FIG. 2). Next, per block 320 (see FIG. 3a), the data processing block 210 (see FIG. 2) determines whether there are any cameras within the boundary calculated in the previous step. The camera position is provided by the camera metadata block 204 (see FIG. 2). If the answer is no (the path identified as "N") then the data processing block 210 (see FIG. 2) traverses to block 338 (see FIG. 3b and discussed below). If the answer is yes (the path identified as "Y") then the data processing block 210 (see FIG. 2) proceeds to block 322 (see FIG. 3a). Next, per block 322 (see FIG. 3a), the data processing block 210 (see FIG. 2) identifies the camera closest to the line between $P_A$ and $P_B$, the camera closest to the sub-path is then selected by the system based on the perpendicular distance, provided the distance is within the selected time delay range (specified by the user as one of the criteria). Referring to FIG. 5a, a schematic of two such cameras C1 and C2 is shown with respect to $P_A$ and $P_B$, with respective distance 404 and 406. In this schematic camera C2 is closer (i.e., 406 is shorter than 404) and thus chosen by the data processing block 210 (see FIG. 2). Next, the data processing block 210 (see FIG. 2) traverses to block 324 (see FIG. 3b), at which point the data processing block 210 (see FIG. 2) calculates the center of the viewing angle ($P_c$) of the identified camera (C2). The viewing angle of each camera is provided to the data processing block 210 (see FIG. 2) by the camera metadata block 204 (see FIG. 2). Referring to FIG. 5b, a schematic of the chosen camera (C2) and the center point ($P_c$) is shown. With $P_c$ defined, the data processing block 210 (see FIG. 2) in block 324 (see FIG. 3b) sets a new start point as $P_c$ and adds path $P_A$ to $P_c$ as a segment of the output data. Alternatively, the data processing block 210 (see FIG. 2) may further finetune the path $P_A$ to $P_c$ by calling the $3^{rd}$-party mapping system using $P_A$ and $P_C$ as start and end points and obtaining a path between these points. The comparison between two different styles of safe path calculations in the alternative approaches described above is in one case the result does not avoid buildings, and in the other case, the results ensure that the calculated path is always on a walkable road. The path that disregards buildings utilizes $P_c$ as a waypoint. However, the generated path that avoids buildings $P_A$ to $P_c$ by calling the $3^{rd}$-party mapping system to obtain a new path from $P_A$ to $P_c$.

Next, per block 326 (see FIG. 3b) the data processing block 210 (see FIG. 2) again generates an input dataset for the $3^{rd}$-party mapping system using the start point (i.e., $P_c$ from the previous block) and the original end point. Next, per block 328 (see FIG. 3b), the data processing block 210 (see FIG. 2) provides the generated input dataset to the $3^{rd}$-party mapping system. Next, per block 330 (see FIG. 3b), the data processing block 210 (see FIG. 2), receives an output dataset from the $3^{rd}$-party mapping system representing a calculated direction map from the provided start point to the provided end point based on the start and end points and the user-specified criteria including travel mode. Next, per block 332 (see FIG. 3b), the data processing block 210 (see FIG. 2) parses the output dataset and identifies number of waypoints as $P_1$, $P_2$, . . . $P_N$. Next, the data processing block 210 (see FIG. 2) traverses to block 314 (see FIG. 3a) and repeats the process until all the waypoints have been accounted for (i.e., as per block 316, see FIG. 3a).

Once all the waypoints have been accounted for, i.e., answer "Y" in block 316 (see FIG. 3a), the data processing block 210 (see FIG. 2) traverses to block 334 (see FIG. 3b) to add the path from $P_A$ to $P_B$ as part of the output data. Thereafter, the flowchart 300 ends at block 336 (see FIG. 3b).

If there are no cameras in the boundary defined by the line from $P_A$ to $P_B$, i.e., answer "N" in block 320 (see FIG. 3a), the data processing block 210 (see FIG. 2) traverses to block 338 (see FIG. 3b) to add the path from $P_A$ to $P_B$ as part of the output data, set $P_B$ as the new $P_A$ and $P_{B+1}$ (i.e., the waypoint after $P_B$ from the last time the $3^{rd}$-party mapping system was called) as the new $P_B$ before traversing back to the block 316 (see FIG. 3a).

Referring to FIGS. 6a-6g, schematics of a screenshot (FIG. 6a) of an interface 600 according to various aspects of the present disclosure is shown which provides a user with tools to interactively visualize and analyze historical CTC incidents in various geospatial and temporal displays. The interface 600 includes a map view 602 that overlays camera coverage indicators 604 along with historical distribution of incidents on the map. The calculated safe path 606 (i.e., according to one embodiment, the path that maximizes the camera coverage during travel between a start point 608 and an end point 610) is displayed on the map. The locations of all cameras are shown as dots 612 on the map. When a computer mouse cursor or other selection indicator is placed over the camera viewing coverage indicators 604 by the user, the corresponding camera locations 612 may change color, for example, by changing from one color to another color, using e.g., highlighted squares (as shown in FIG. 6e), or by making the location indicators thicker. Other color changes or indicators may be used to indicate selection or user inspection of a particular camera location 612. The cameras that capture the most number of crimes for a user specified time period are highlighted, bolded, or otherwise indicated on the map in FIG. 6b. FIG. 6f shows the interactive time selection interface 613 that allows users to select a historical time window for analysis and temporally slide through CTC data at various data aggregation levels (e.g., by day, week, month, year). FIG. 6c is a schematic representation of a calculated path that maximizes camera coverage.

Figure 7A:
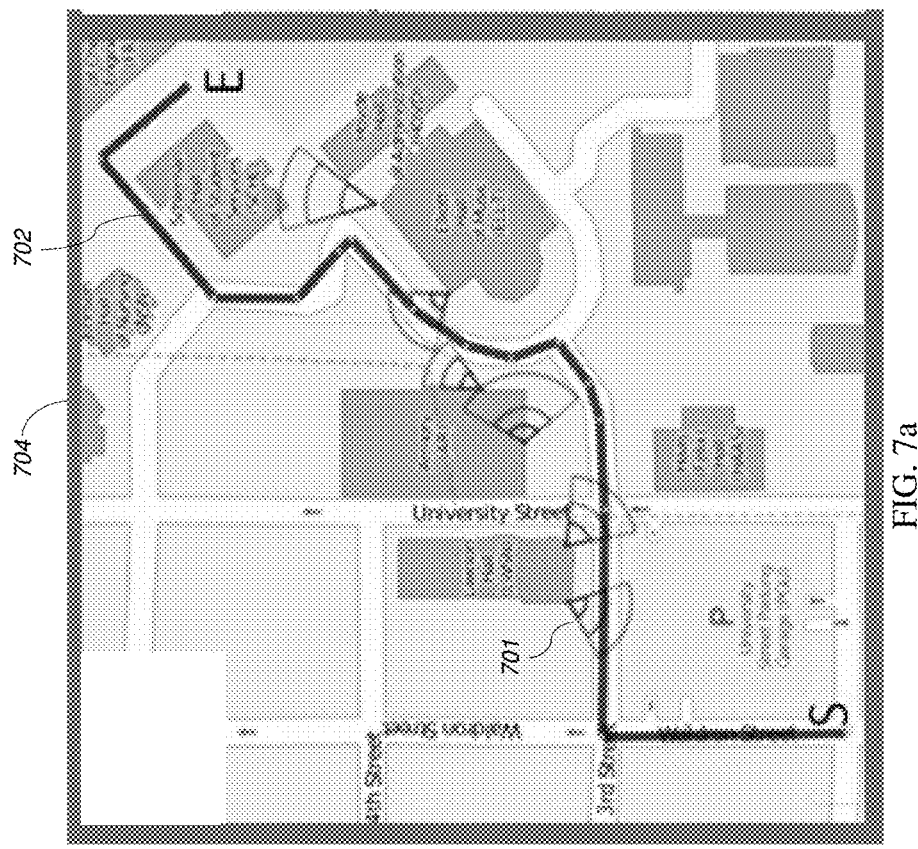
FIG. 7a is a schematic representation of a walking path obtained using a $3^{rd}$-party mapping system from a start point (S) to an end point (E), overlaid on a map depicting locations of cameras.
Figure 7B:
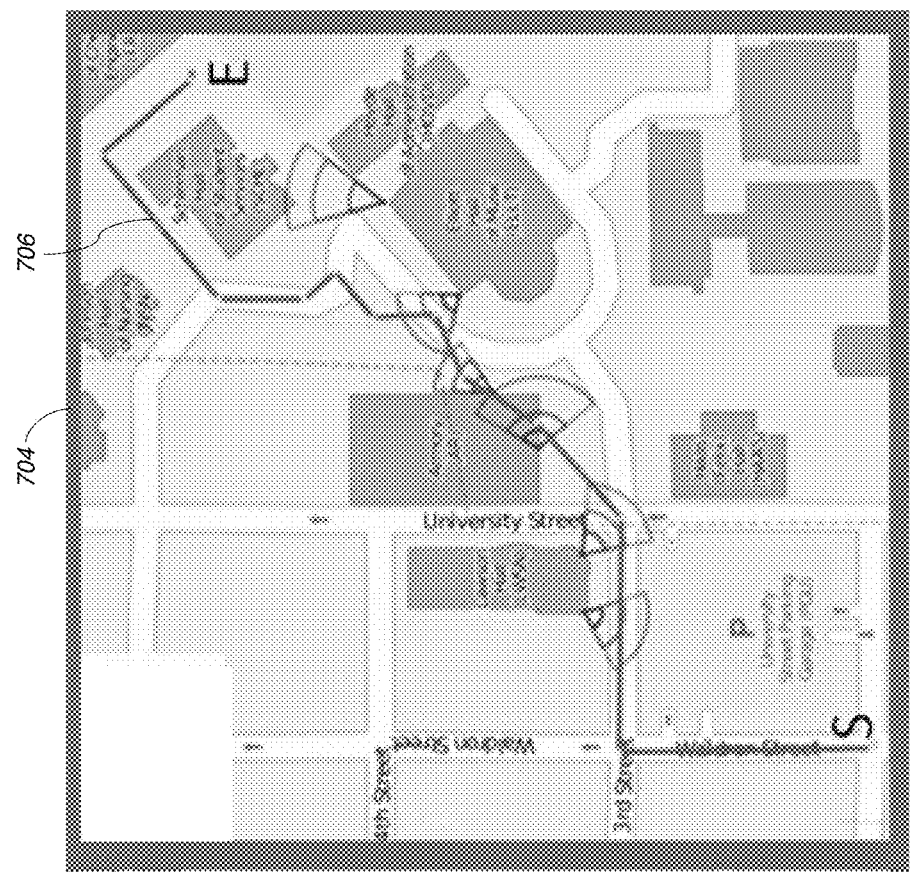
FIG. 7b is a schematic representation of an optimized path 706 according to one aspect of the present disclosure, which is the shortest path obtained by disregarding buildings in order to maximize camera coverage along the resulting path.

FIG. 7a shows a walking path 702 obtained using a $3^{rd}$-party mapping system from a start point (S) to an end point (E), overlaid on a map 704, depicting locations of cameras 701. FIG. 7b shows an optimized path 706 according to one aspect of the present disclosure, which is the shortest path obtained by disregarding buildings in order to maximize camera coverage along the resulting path 706.

Figure 7C:
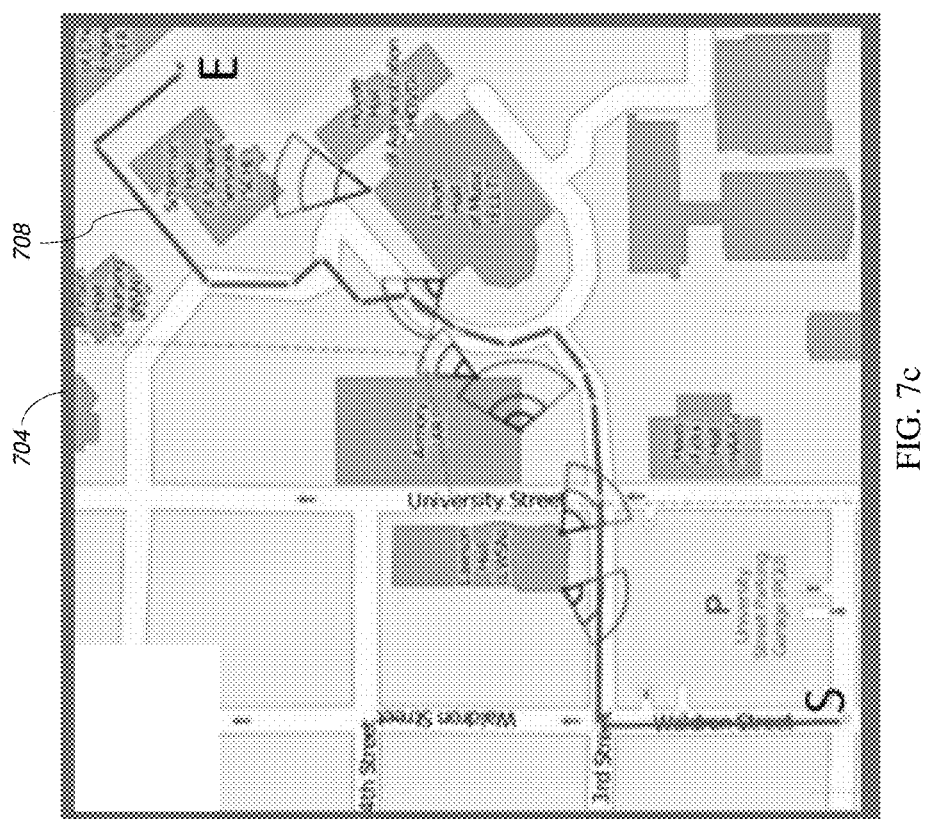
FIG. 7c is a schematic representation of an optimized path determined by the system of the present disclosure that ensures the walking path always remains on roadways, while otherwise providing maximized camera coverage along the path.

According to another aspect shown in FIG. 7c, an optimized path 708 is determined by the system that ensures the walking path always remains on roadways, while otherwise providing maximized camera coverage along the path 708. In certain aspects, selection between the two styles of optimized paths 706 and 708 are provided on the interface 600 (see FIG. 6a). The interface 600 (see FIG. 6a) may allow the user to select a time delay threshold value that sets the maximum deviation allowed from the shortest path. For example, if the user sets the maximum deviation to be 3 minutes and the original path takes 10 minutes, then the new calculated path will take less than a total of 13 minutes for the user to arrive at the desired destination.

In certain aspects, the provided specifications of the CCTV cameras dictate that each camera may have up to three viewing ranges (FIG. 6g). For example, a human face is recognizable in the smallest range R (603). Gestures are recognizable in the second viewing range (layer D, 605). In range O (indicated by 607), only movements are identifiable. Additionally, the system may allow the user to drag points along the safe path in order to modify the path to their desired route.

According to certain aspects, after optimizing the calculated safe path, the disclosed system (via interface 600) displays the percentage of camera coverage along the generated path (as shown in FIG. 6a). In FIG. 8a, the percentage is given by l2/(l1+2+l3), since only the region labeled as l2 is within the coverage of a camera.

According to certain aspects, the disclosed system detects whether a waypoint falls within a given camera viewing angle. To detect this, the system utilizes a cross-product based method to detect points in a sector. If point D is inside a sector, the cross-product result of vector AB and AD is negative and the cross-product result of vector AC and AD is positive (FIG. 8b). If the point meets the requirement, then the distance from D to A is calculated. If the length AD is shorter than this sector's radius, then the point D is determined to be a point inside the sector.

According to various aspects, the disclosed system may also provide a ranking of all cameras based on importance in capturing historical crime activity. The ranking may be used to provide a quick guide as to which cameras to monitor at a specific time. Referring back to FIG. 6b shows heavier outlines (e.g., could also be a different color) of sectors that represent those camera view ranges that contain the largest number of CTC incidents in the past year, or another period of time. The sectors highlighted with thick boundaries are cameras that cover the largest number of CTC incidents. Several cameras are highlighted which indicate that they all cover substantially equal number of CTC incidents. With the sidebar in FIG. 6f, users can select different dates. By sliding through the sidebar, users can observer the animation of Heatmap based on a continuous period of time. Therefore, CTC incidents chosen by the user are updated as the user scrolls through time (FIG. 6f). With the filtered crime incident locations, the system computes the total number of incidents that occurred in a given camera's view range and use the result to determine the camera's importance.

The disclosed system may also utilize historical crime data to provide users with suggestions for future camera setup locations. By categorizing historical criminal incidents by their locations, the system determines the locations of high frequency crime occurrences. If no camera monitors such a location, then the system provides suggestions of locations to install a new CCTV camera. This feature is based on the past years' crime data or by cataloging user mapping requests with portions that do not include any camera coverage. By using this result, the system categorizes crime by locations according to grids on the map. As can be seen in FIG. 6d, two grids (i and ii) adjoin to each other on the map. Each grid includes four small grids. This result is based on equal division on the areas on the map. Suppose one is to only focus on a zone of interest (e.g., a university campus area). The area can be divided into substantially equal sized squares. Next, the squares are colored (or highlighted) based on the number of incidents in that square area. The squares that cover a larger number of crimes has darker color.

However, if a calculated square area is too larger and one camera cannot monitor that large of an area, the area will be evenly divided into four substantially equal size smaller squares. Thereafter, one smaller square will contain more historical CTC incidents as the suggested area for future camera installation location.

The grid is divided into four small grid according to viewing area of a camera Colors or other indicia are assigned to the grids based on the number of crimes that occurred in the grid area. The darkest grid (or other assigned indicia) provides suggested camera installation location.

Further referring to FIG. 1, the one or more processing units 160, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

The one or more processing units 160 can implement processes of various aspects described herein. The one or more processing units 160 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. The one or more processing units 160 can include Harvard-architecture components, modified-Harvard-architecture components, or Von-Neumann-architecture components.

The phrase "communicatively connected" or connectivity includes any type of connection, wired or wireless, for communicating data between devices or processors. These devices or processors can be located in physical proximity or not. For example, the one or more processing units 160, the one or more databases 180, and the one or more input/output devices 190 are shown separately from the one or more processing units 160 but can be stored completely or partially within the one or more processing units 160.

The one or more input/output devices 190 can include a mouse, a keyboard, another computer (connected, e.g., via a network or a null-modem cable), or any device or combination of devices from which data is input to the one or more processing units 160. The one or more input/output devices 190 also can include a display device, a processor-accessible memory, or any device or combination of devices to which data is output by the one or more processing units 160. The one or more input/output devices 190 and the one or more databases 180 can share a processor-accessible memory.

The connectivity 160R_ (e.g., 160R1, 160R2, and 160R3) can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. connectivity 160R_ (e.g., 160R1, 160R2, and 160R3) sends and receives electrical, electromagnetic or optical signals that carry digital or analog data streams representing various types of information across network link via a switch, gateway, hub, router, or other networking device.

The one or more processing units 160 can send messages and receive data, including program code, through the connectivity 160R_ (e.g., 160R1, 160R2, and 160R3). For example, a server can store requested code for an application program (e.g., a JAVA applet) on a tangible non-volatile computer-readable storage medium to which it is connected. The server can retrieve the code from the medium and transmit it through connectivity 160R_ (e.g., 160R1, 160R2, and 160R3). The received code can be executed by the one or more processing units 160 as it is received, or stored in the one or more databases 180 for later execution.

The one or more databases 180 can include or be communicatively connected with one or more processor-accessible memories configured to store information. The memories can be, e.g., within a chassis or as parts of a distributed system. The phrase "processor-accessible memory" is intended to include any data storage device to or from which the one or more processing units 160 can transfer data, whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the one or more databases 180 can be a tangible non-transitory computer-readable storage medium, i.e., a non-transitory device or article of manufacture that participates in storing instructions that can be provided to processor 186 for execution.

In an example, the one or more databases 180 includes code memory, e.g., a RAM, and disk, e.g., a tangible computer-readable rotational storage device such as a hard drive. Computer program instructions are read into code memory from disk. The one or more processing units 160 then executes one or more sequences of the computer program instructions loaded into code memory, as a result performing process steps described herein. In this way, the one or more processing units 160 carries out a computer implemented process. For example, steps of methods described herein, blocks of the flowchart illustrations or block diagrams herein, and combinations of those, can be implemented by computer program instructions. Code memory can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into the one or more processing units 160 (and possibly also other processors), to cause functions, acts, or operational steps of various aspects herein to be performed by the one or more processing units 160 (or other processors). Computer program code for carrying out operations for various aspects described herein may be written in any combination of one or more programming language(s), and can be loaded from disk into code memory for execution. The program code may execute, e.g., entirely on the one or more processing units 160, partly on the one or more processing units 160 and partly on a remote computer connected to data processing system 140, or entirely on the remote computer.

While the present disclosure has been described with respect to camera identification and camera metadata determination approaches based on pre-determined information, there is an unmet need to be able to identify unknown network cameras and to determine metadata associated with those cameras.

Figure 9:
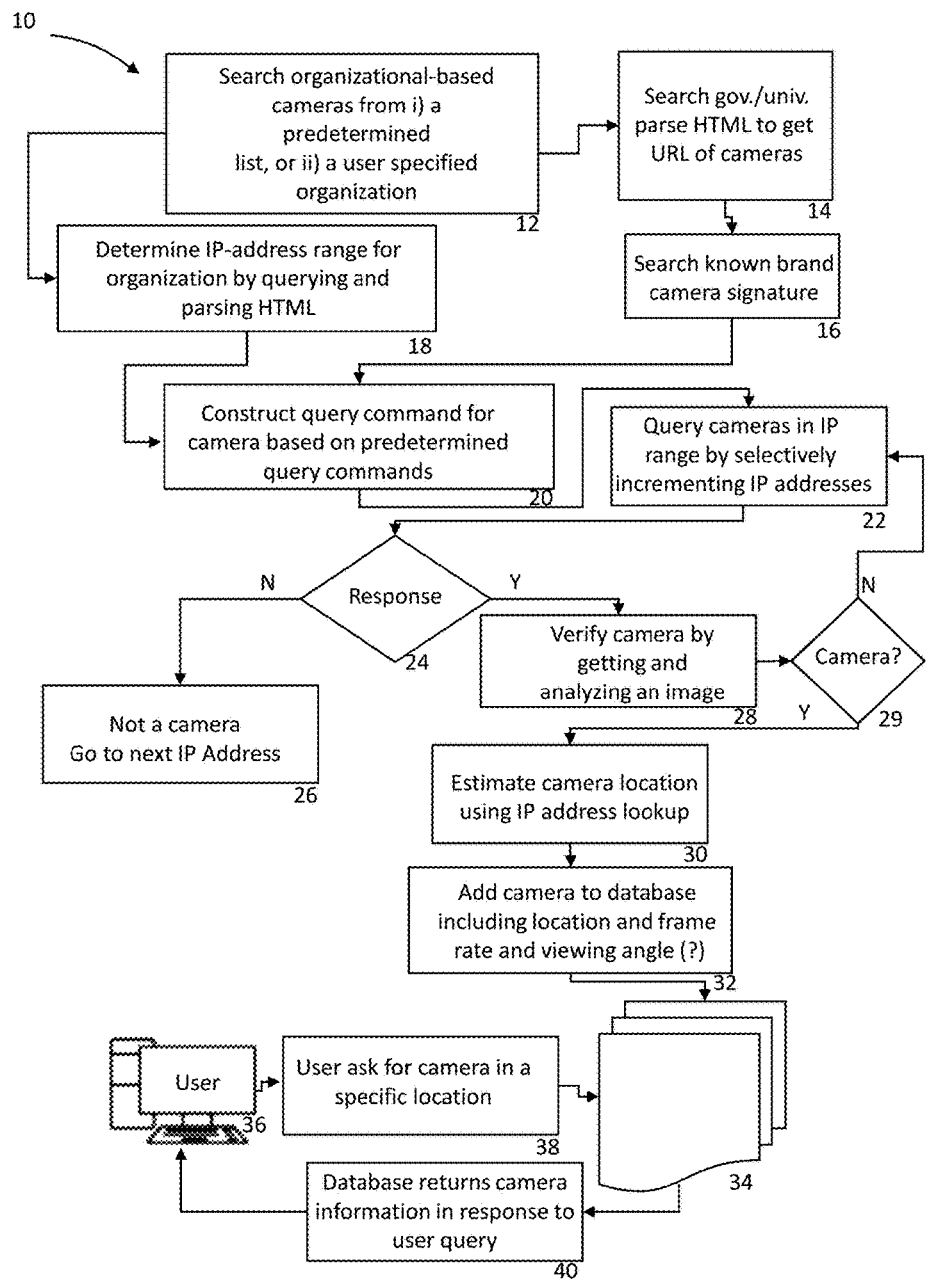
FIG. 9 is a flowchart according to the present disclosure for identifying internet protocol (IP)-based cameras and steps associated with determining metadata associated with the identified cameras.
Figure 10:
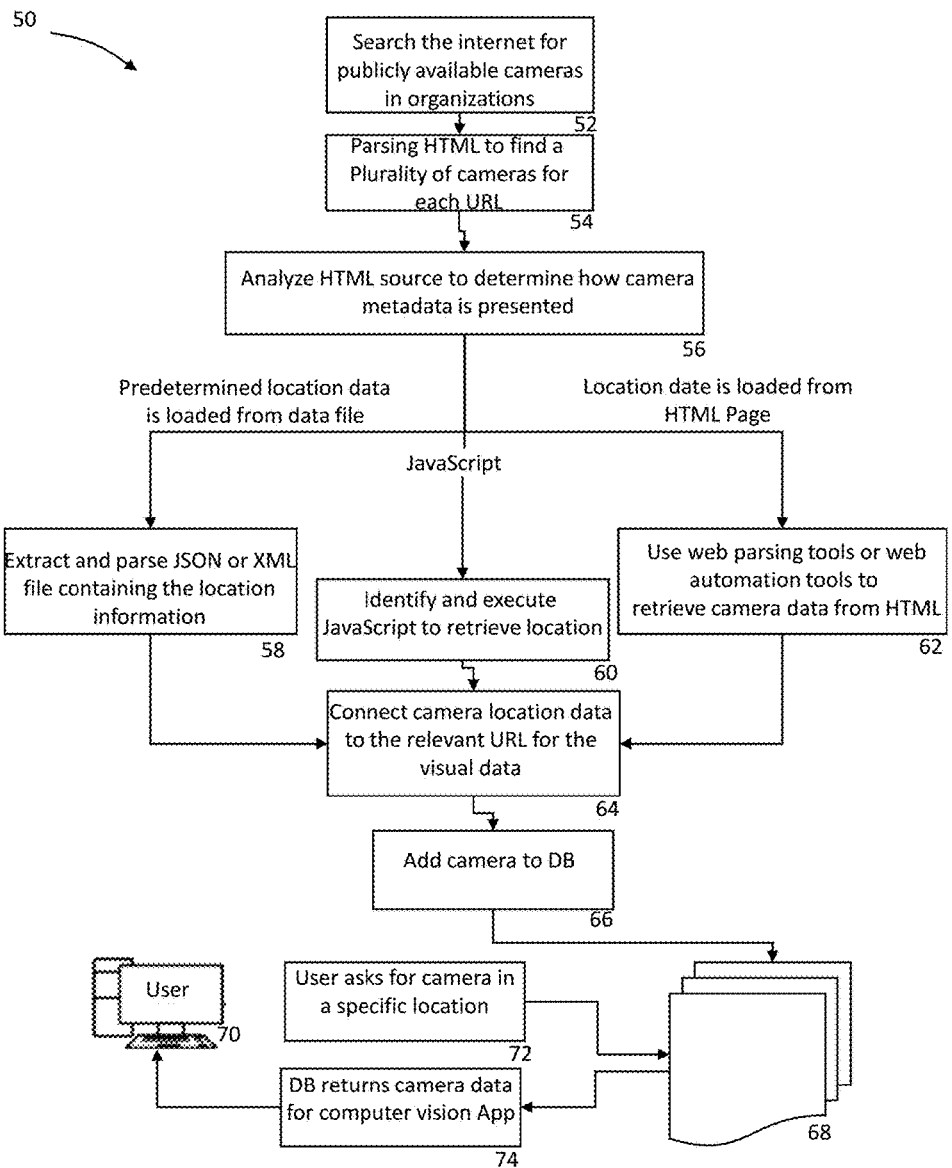
FIG. 10 is a flowchart according to the present disclosure for identifying non-IP-based cameras and steps associated with determining metadata associated with the identified cameras.

FIGS. 9 and 10 provide flow charts that can be used by the camera identification block 202, the camera metadata block 204, and the data processing block 210 in order to statically or dynamically identify publicly accessible cameras (including IP-based cameras as well as non-IP-based cameras). IP-based cameras can be accessed individually and from which visual data can be retrieved. Usually, the data streams from Non-IP cameras are aggregated into file servers and are accessible through websites. Many websites aggregate visual data from multiple cameras. The data processing block 210 can monitor whether anomalies (an accident) have occurred on these streets and alert authorities. As mentioned in the background section of the present disclosure, a potential of the real-time data analysis from network cameras can only be exploited if the data is aggregated and made available statically into a repository or dynamically on the fly as requested by a user. However, there is a wide variation of aggregation of data. FIG. 10 provides a novel and unique approach to automatically and either statically or dynamically navigate through these variations.

Referring to FIG. 9, a flowchart 10 of the IP-based camera identification and metadata determination method is provided. The flowchart 10 begins with searching organizational-based cameras in block 12. This search is in response to i) a predetermined list of organization; or ii) a user requesting identification of cameras associated with an organization. The organization can be a city, a township, a university campus, a private institution, or a plurality of other organization, each with cameras that are either secure or publicly available. The data processing block 210 in response to an organization selection queries (e.g., using GOOGLE) that organization for cameras. For example, a simple query can be "New York Traffic Cameras." The data processing block 210 parses the returned HTML for URL of cameras. However, typically in such HTML outputs there may be a substantial amount of non-useful information. In order to further filter the information, the data processing block 210 is adapted to search for known camera signatures in the returned HTML as provided in block 16. The output of block 16 includes a list of IP addresses for potential cameras (however, at this point whether an IP address is a camera or not is not yet fully determined). Next, in addition or alternatively, in block 18, the data processing block 210 queries the organizational list of block 12 to query for a list of IP ranges for the associated organizations. The IP address range is determined by parsing a returned HTML. With a range of IP addresses (either via block 18 or block 16, or both), in block 20 various queries are constructed to determine whether each IP address obtained (either from block 18 or block 16) belongs to a camera. The query commands (e.g. using HTTP GET command) can be from a list of predetermined query commands run for i) each IP address; or ii) based on selective criteria specified by a user, as provided in block 22. Next in block 24, the data processing block 210 queries to determine whether the camera responds. If the answer to that query is no (identified as "N" because the camera did not respond, as in block 26), the data processing block 210 determines that to be a non-camera, and proceeds to the next IP address. If, the answer to that query is yes (identified as "Y" because a response to the query command was obtained, as in block 28), the data processing block 210 confirms the responding IP address is indeed a camera by requesting an image and inspecting the data associated with the image, as in block 29. If, the answer to that query is yes (identified as "Y" because inspection of data confirms data is from a camera), the data processing block 210 proceeds to block 30. If, the answer to that query is no (identified as "N" because inspection of data confirms data is not from a camera), the data processing block 210 returns back to the block 22 to increment to the next IP address.

In block 30, the data processing block 210 estimates camera location by running a query to determine physical location based on IP address, as known to a person having ordinary skill in the art. Alternatively or in addition (not shown), the data processing block 210 can access street views from the $3^{rd}$-party mapping system by accessing the third-party mapping interface 206 and determine or confirm the location of camera identified in blocks 28 and 29. An example of such a technique is provided in "Accurate Localization In Dense Urban Area Using Google Street View Images" by Salarian et al. (2014) found at https://arxiv.org/ftp/arxiv/papers/1412/1412.8496.pdf, incorporated by reference into the present disclosure in its entirety.

With the location information determined and confirmed, the block 32 adds the IP-based camera to a database 34 for a later use in a static approach or immediate use on the fly in a dynamic approach, as per block 32. The data processing block 210 then again goes back to block 22 (not shown) to increment the next IP address, until all IP addresses have been exhausted. The user (identified as block 36) using a computer connection or a mobile device connection can then request cameras in a specific location or organization as per block 38, and the data processing block 210 search the database 34 and returns camera information (and optionally images) as per block 40.

Referring to FIG. 10, a flow chart 50 of the non-IP-based camera identification and metadata determination method is provided. The flowchart 50 begins in a similar manner as flowchart 10 in FIG. 9 by searching for non-IP cameras (e.g., entering "Atlanta Traffic Cameras) in an organization in block 52. In block 54, the data processing block 210, parses the retuned HTML to find a plurality of cameras. In block 56, the HTML is analyzed to determine how the cameras' metadata is presented. Three known approaches are contemplated by the present disclosure. In one approach, predetermined location data is loaded from a data file by extracting and parsing JSON or XML files containing location information, as per block 58. In another embodiment, a JavaScript is detected and the data processing block 210 executes the JavaScript in block 60 to determine location data. In yet another embodiment, the location is simply loaded from the returned HTML by using a web parsing tool, as known to a person having ordinary skill in the art, per block 62.

Once all the camera locations have been identified from any combination of the above embodiments, the data processing block 210 in block 60 couples camera location to each URL identified in block 54. In block 66, the data processing block 210 adds the camera to a database 68 for use by the user per blocks 72 and 74, as discussed in FIG. 9.

With respect to FIGS. 9 and 10, Parsing scripts take advantage of several PYTHON modules and APIs. Two of the most commonly used tools are the HTML parsing module SELENIUM and BEAUTIFULSOUP4, known to a person having ordinary skill in the art. SELENIUM is a browser automation tool that supports FIREFOX and CHROME. For parsing camera data, SELENIUM has several advantages. SELENIUM executes all the JavaScript on a page load, which is one major advantage when compared to BEAUTIFULSOUP4. SELENIUM allows access to webpage elements by Xpath. Xpath is a way of navigating the hierarchy of the HTML syntax. BEAUTIFULSOUP4 (BS4) is another tool used for parsing websites for camera data. BS4 uses a different approach: Instead of fully rendering the page in a browser, BS4 downloads the page source and parses the HTML into a Python object. BS4 does not fully render the page, so it is faster than Selenium. Selenium can access information only in the current fully rendered page; BS4 can store multiple HTML pages, each in its own PYTHON object. BS4 does not simulate user interactions, such as clicks or keyboard presses; thus, BS4 is faster than SELENIUM.

Website-parsing scripts that take advantage of both SELENIUM and BS4 are often the best option. Selenium can be used to load the webpage in a headless browser, such as PhantomJS. PhantomJS does not need to fully render the page. After the page is rendered, the HTML source can be sent to BS4 scripts to extract information. This method is faster and more reliable.

Information about camera location may be obtained by analyzing the JSON or XML file. It is possible using the CHROME DEVELOPER TOOLS to view XML HTTP Requests (XHR), as provided below.
{markers: [{id: "368", latitude: "40.7914267751247", longitude: "-73.93807411193848", . . . }, . . . ]}
▶ markers: [{id "368", latitude: "40.79142677512478", longitude: "-73.93887411193848", . . . }, . . . ]

Some websites load many different XHR files; some sites load data from several JSON files into one map. If the JSON file containing the location data can be found, Python JSON module is used to parse the JSON data and retrieve the location information. In the snippet of JSON code below, the latitude, longitude, and camera ID can be identified.

While not shown, other aspects of metadata discussed above (including frame rate) can also be determined for both IP and non-IP based cameras. In one embodiment, view angle for each identified camera can be determined by a method provided in "Estimating Camera Pose from a Single Urban Ground-View Omnidirectional Image and a 2D Building Outline Map" (2010) by Cham et al. found at http://ieeexplore.ieee.org/abstract/document/5540191/, incorporated by reference in its entirety into the present disclosure.

To determine a camera's frame rate, the data processing block 210 detects the changes between two adjacent frames. This may take from several seconds (for a camera with a high refresh rate) to a few hours (for a camera with a low refresh rate).

The data processing block 210 obtains the information about a list of cameras from the database and retrieves snapshots from these cameras.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method for determining a travel path, comprising:
   (a) establishing an interface with a $3^{rd}$-party mapping system via an electronic communication device;
   (b) receiving a start point and an end point by a user on the interface for a preselected zone;
   (c) generating input data for the $3^{rd}$-party mapping system based on the start and end points;
   (d) providing the input data to the $3^{rd}$-party mapping system;
   (e) receiving output data from the $3^{rd}$-party mapping system associated with a path from the start point to the end point;
   (f) identifying waypoints in the output data;
   (g) identifying a camera from a predetermined list of cameras of the preselected zone closest to a line between each of the two consecutive waypoints;
   (h) determining a center of a viewing angle of the identified camera from a list of predetermined viewing angles for each of the cameras in the list of cameras of the preselected zone;
   (i) calculating a path from the start point through each of the viewing angle centers to the end point;
   (j) setting the view angle center between each of the two consecutive waypoints as a new start point and iterating steps (c) through (i) until the end point is one of the two consecutive waypoints, at which iteration the incremental path is calculated from a viewing angle center representing the last pair of consecutive waypoints to the end point, and
   (k) displaying the calculated path on the electronic communication device, wherein the predetermined list of cameras is determined by:
      (A) receiving name of an organization,
      (B) identifying a range of internet protocol (IP) addresses associated with the organization,
      (C) querying each IP address in the range of the IP addresses, (D) receiving a response from the IP addresses in response to the queries, (E) verifying the received response is from a camera by obtaining an image file from the IP address and analyzing the image file, and (F) adding the IP address to the predetermined list of cameras, and wherein location of each camera is determined by:

(A) using an IP address to physical address translator, and (B) verifying the location information by using a street-view of a $3^{rd}$-party mapping software, wherein steps (a) through (k) are adapted to be performed by one or more processors.

2. The method of claim 1, the predetermined list of cameras is further obtained by:

(G) performing an internet search via a script for the name associated with the organization, and (H) parsing the returned HTML for a list of IP addresses for the associated organization.

3. The method of claim 1, the step (g) further comprising:

establishing a boundary between each of the two consecutive waypoints;

wherein the identified camera is within the boundary if a camera from the list of predefined cameras is found within the boundary, else, the calculated path goes through the two consecutive waypoints.

4. The method of claim 3, wherein the boundary is a rectangular area having a width based on the spacing between the two consecutive waypoints and a height.

5. The method of claim 4, the height is provided as a selective input via the electronic communication device.

6. The method of claim 4, the height is a predetermined variable.

7. The method of claim 1, the step (g) of each iteration further comprising:

establishing a boundary between each of the two consecutive waypoints;

wherein the identified camera is within the boundary if a camera from the list of predefined cameras is found within the boundary, else, the calculated path goes through the two consecutive waypoints.

8. The method of claim 7, wherein the boundary is a rectangular area having a width based on the spacing between the two consecutive waypoints and a height.

9. The method of claim 8, the height is provided as i) a selective input via the electronic communication device, or ii) a predetermined variable.

10. A system for determining a travel path, comprising:

a network of at least one camera;

a communication hub coupled to the network of at least one camera;

at least one electronic communication device;

a data processing system coupled to the communication hub, the data processing system comprising one or more processors configured to:

(a) establish an interface with a $3^{rd}$-party mapping system via the electronic communication device, (b) receive a start point and an end point by a user on the interface for a preselected zone, (c) generate input data for the $3^{rd}$-party mapping system based on the start and end points, (d) provide the input data to the $3^{rd}$-party mapping system, (e) receive output data from the $3^{rd}$-party mapping system associated with a path from the start point to the end point, (f) identify waypoints in the output data, (g) identify a camera from a predetermined list of cameras of the preselected zone closest to a line between each of the two consecutive waypoints, (h) determine the center of a viewing angle of the identified camera from a list of predetermined viewing angles for each of the cameras in the list of cameras of the preselected zone, (i) calculate a path from the start point through each of the viewing angle centers to the end point, (j) set the view angle center between each of the two consecutive waypoints as a new start point and iterating steps (c) through (i) until the end point is one of the two consecutive waypoints, at which iteration the incremental path is calculated from a viewing angle center representing the last pair of consecutive waypoints to the end point, and (k) display the calculated path on the electronic communication device, wherein the predetermined list of cameras is determined by:

(A) receiving name of an organization, (B) identifying a range of internet protocol (IP) addresses associated with the organization, (C) querying each IP address in the range of the IP addresses, (D) receiving a response from the IP addresses in response to the queries, (E) verifying the received response is from a camera by obtaining an image file from the IP address and analyzing the image file, and (F) adding the IP address to the predetermined list of cameras, and wherein location of each camera is determined by:

(A) using an IP address to physical address translator, and (B) verifying the location information by using a street-view of a $3^{rd}$-party mapping software.

11. The system of claim 10, the predetermined list of cameras is further obtained by:

(G) performing an internet search via a script for the name associated with the organization, and (H) parsing the returned HTML for a list of IP addresses for the associated organization.

12. The system of claim 10, the step (g) of each iteration further comprising:

establishing a boundary between each of the two consecutive waypoints;

wherein the identified camera is within the boundary if a camera from the list of predefined cameras is found within the boundary, else, the calculated path goes through the two consecutive waypoints.

13. The system of claim 12, wherein the boundary is a rectangular area having a width based on the spacing between the two consecutive waypoints and a height.

14. The system of claim 13, the height is provided as i) a selective input via the electronic communication device, or ii) a predetermined variable.

15. The system of claim 10, the communication hub includes one or more of a group of at least of cellular tower and a cloud-based information exchange.

16. The system of claim 11, the electronic communication device communicates with the data processing system via one or more CDMA, GSM Bluetooth, and 802.11 protocols.

17. The system of claim 10, the network of at least one camera communicates with the data processing system via one or more CDMA, GSM Bluetooth, and 802.11 protocols.

18. The system of claim 10, the data processing system further comprising:
 one or more storage devices; and
 one or more user input/output devices.

\* \* \* \* \*